United States Patent
Vetter et al.

[11] 3,895,515
[45] July 22, 1975

[54] WING THRUSTER

[75] Inventors: Ronald F. Vetter; Ray A. Miller; Edward A. Panella, all of Ridgecrest; James J. Rosolanka, China Lake, all of Calif.

[73] Assignee: The United States of America as represented by the Secretary of the Navy, Washington, D.C.

[22] Filed: Dec. 26, 1973

[21] Appl. No.: 428,598

[52] U.S. Cl................................................. 73/71.5 R
[51] Int. Cl.² ......................................... G01N 29/00
[58] Field of Search .................. 73/71.5 R, 432 SD; 60/200 R, 259

[56] References Cited
UNITED STATES PATENTS

| | | | |
|---|---|---|---|
| 2,880,582 | 4/1959 | Turansky et al. | 60/259 |
| 3,113,451 | 12/1963 | Beals et al. | 73/71.5 R |
| 3,330,114 | 7/1967 | McQueen | 60/200 R |
| 3,595,020 | 7/1971 | Schubert | 60/259 |

*Primary Examiner*—James J. Gill
*Assistant Examiner*—Anthony V. Ciarlante
*Attorney, Agent, or Firm*—R. S. Sciascia; Roy Miller; Gerald F. Baker

[57] ABSTRACT

A device is provided for attachment near the wing tip of an aircraft for the purpose of delivering a predetermined impulse to the wing for test purposes. Thrust is created by sudden release of fluid from a pressure vessel through one or more expulsion valves opening at an angle of approximately 90° to the wing.

9 Claims, 4 Drawing Figures

WING THRUSTER

BACKGROUND OF THE INVENTION

In the process of testing a super critical wing aircraft, it was considered necessary to conduct specific tests involving wing flutter. In this testing it was considered desirable to create a series of 40 millisecond impulses of approximately 70 pounds force ($1b_f$) near the tip of the wing. A number of thruster devices have been devised in the past for similar applications but were considered inapplicable or inadequate for the tests in the present instance.

Prior devices either constituted mechanical vibrators incapable of giving sudden thrusts or were explosive devices capable of only one shot at a time. The explosive devices, furthermore, are considered more hazardous, less efficient, and less versatile than the fluid reaction motor of the present invention.

The present invention provides a safe and reliable means for producing plural thrusts by remote control. The apparatus, which is fastened at a selected point spaced from the tip of the wing to be tested, comprises a pressure vessel divided by a free piston or the like for supplying fluid under pressure to one or more thrust valves having exit ports approximately at right angles to the under surface of the wing. When the valves are opened, reaction forces act upwardly on the wing.

DESCRIPTION AND OPERATION

Figure 1:
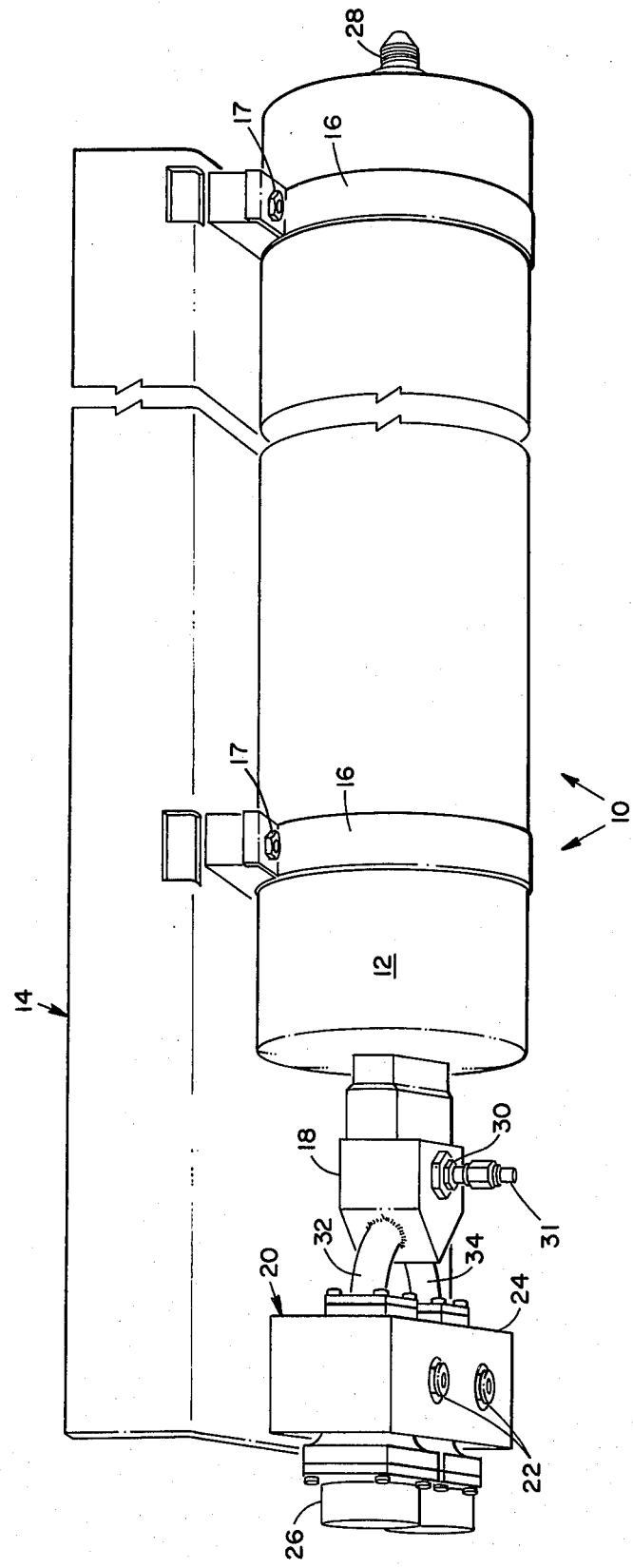
FIG. 1 is a perspective view of a wing thruster according to the present invention.

In FIG. 1, a wing thruster system 10 is shown which comprises a pressure accumulator 12 mounted on a channel member 14 by means of straps 16 and bolts 17. The accumulator 12 is connected by a Y-block 18 to a valve assembly 20 which includes two thrust valves 22 mounted in bracket 24. Although two valves are shown in the embodiment illustrated, it has been demonstrated that a single valve may be designed to achieve the same results. It is also contemplated that more than two valves may be used, for example, for broader thrust range coverage. The valves shown are electrically operable by means of solenoid actuators 26 as more fully discussed in connection with FIG. 2, below.

A fill and vent valve 28 is provided in one end of accumulator 12 and a second fill and vent valve 30 is provided in the Y-connector 18. Y-connector 18 is connected to thruster valves 22 by means of two pipes 32, 34.

The fill and vent valves permit filling when turned counterclockwise and positive shut off when rotated clockwise. The valves used in the unit illustrated were Pyronetics, Inc. model 1176 stainless steel having an operating pressure of better than 4,000 psig.

Figure 2:
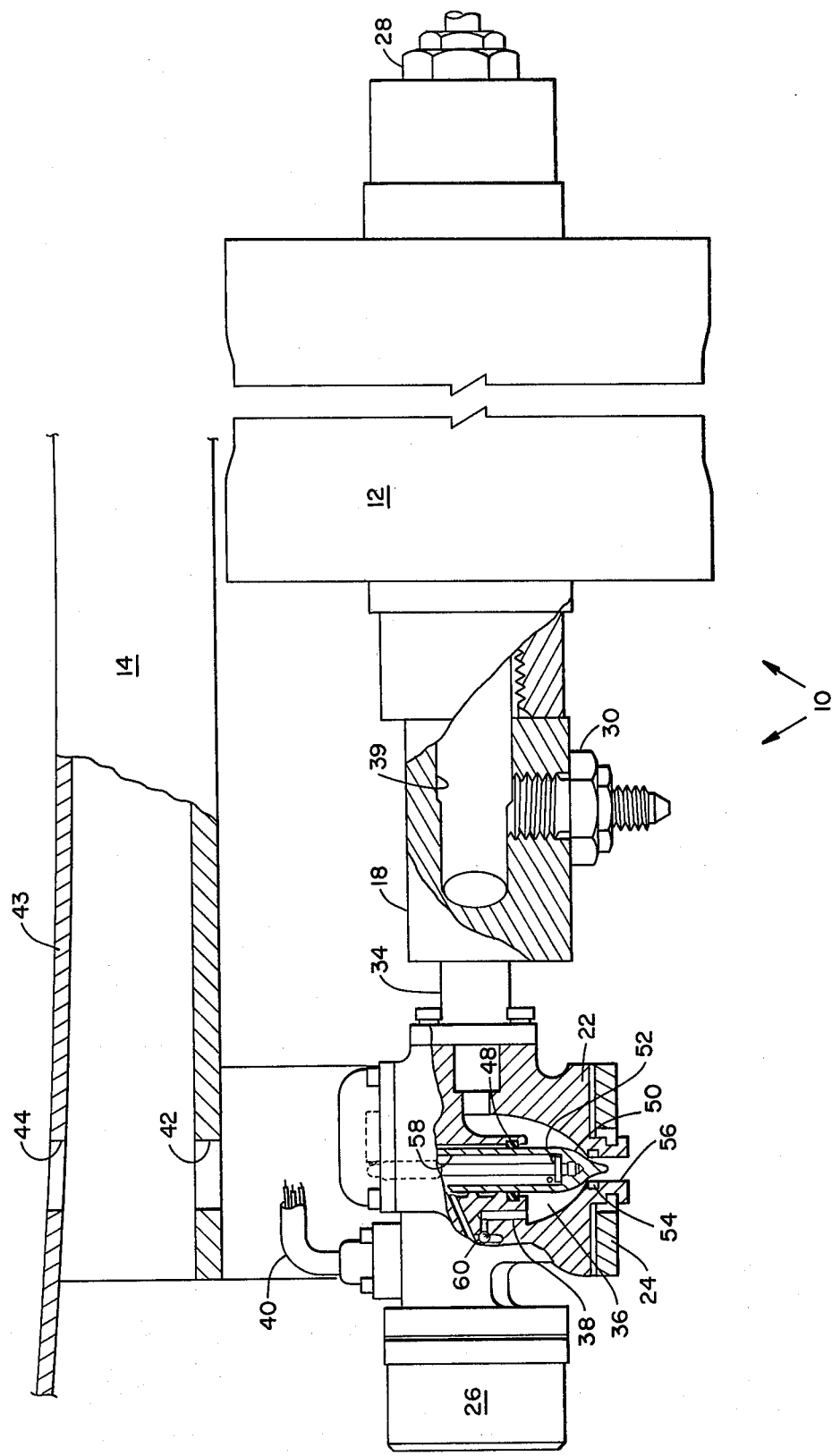
FIG. 2 is a side elevation partly in cross section of the wing thruster of FIG. 1 in place on an aircraft wing.

As shown in FIG. 2, pipe 34 and passage 39 provide communication between accumulator 12 and chamber 36 in valve 22. Chamber 36 communicates through port 38 to a fluid actuating mechanism operated by solenoid 26. The fill and vent valve 30 communicates with the interior of the accumulator 12 through passage 39 for purposes which will be further discussed in relation to FIG. 3 below. Electrical wiring for the solenoid as well as an indicator light, not shown, are contained in cable 40 which may be passed through the hole 42 in channel member 14.

Prior to mounting the assembly on an aircraft, the channel member 14 is contoured to fit a mock-up of the wing section and a contoured plate 43 is welded thereto. The entire assembly is then mounted to the aircraft by the attachment of plate 43 on the surface of the wing. Plate 43 may conveniently be placed over an access hole in the wing, and cable 40 may be led through a hole 44 in plate 43.

In thruster valves 22, a pintle 50 is normally biased by a spring 52 to rest upon a seat 54 thus closing an exit orifice 56. Spring 52 is sufficiently strong to hold pintle 50 upon seat 54 until pressure in chamber 36 exceeds a predetermined value which is greater than the pressure of spring 52 combined with the fluid pressure in the spring cavity 58. (In this case, over 300 psid.)

Figure 4:
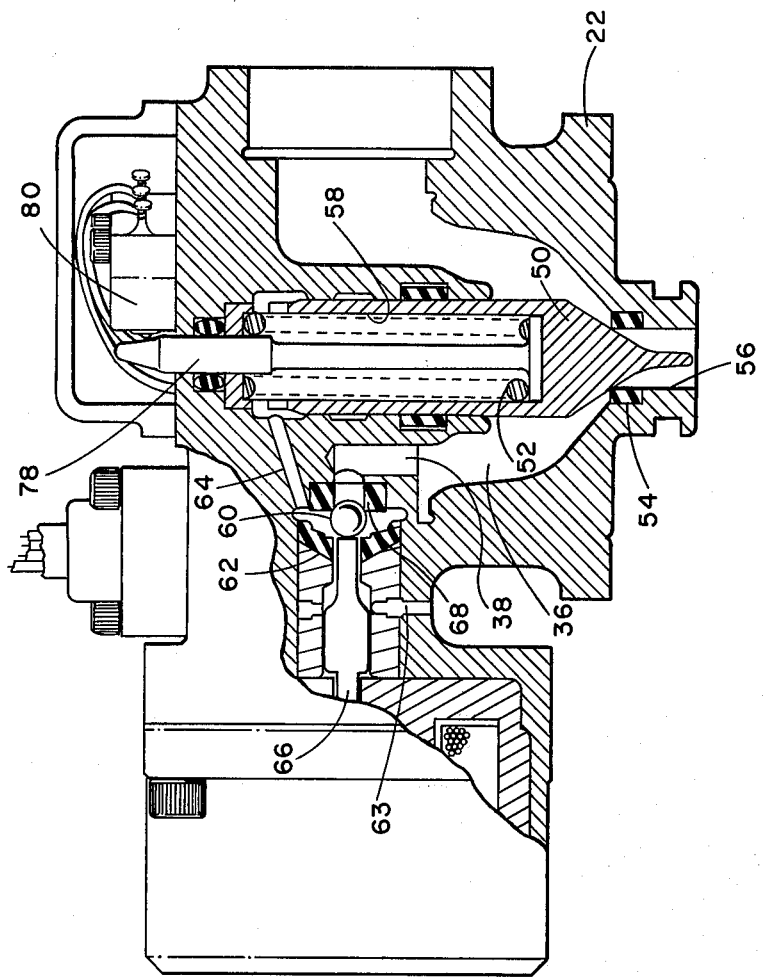
FIG. 4 is an enlarged side elevation partly in section of one of the valves.

The actuating mechanism of valve 22 includes a ball 60 which normally rests upon a seat 62 (see FIG. 4) blocking communication from chamber 36 through passage 38 and a vent passage 63 and allowing communication to spring cavity 58 through passage 64.

When solenoid 26 is actuated, the plunger 66 forces ball 60 off of seat 62 onto seat 68, blocking communication between chamber 36 and cavity 58 and, at the same time venting cavity 58. The result is the creation of a sudden pressure differential between the respective chambers causing pintle 50 to be forced off of seat 54. The resulting sudden escape of fluid through port 56 causes the desired reaction for purposes of the test device.

Figure 3:
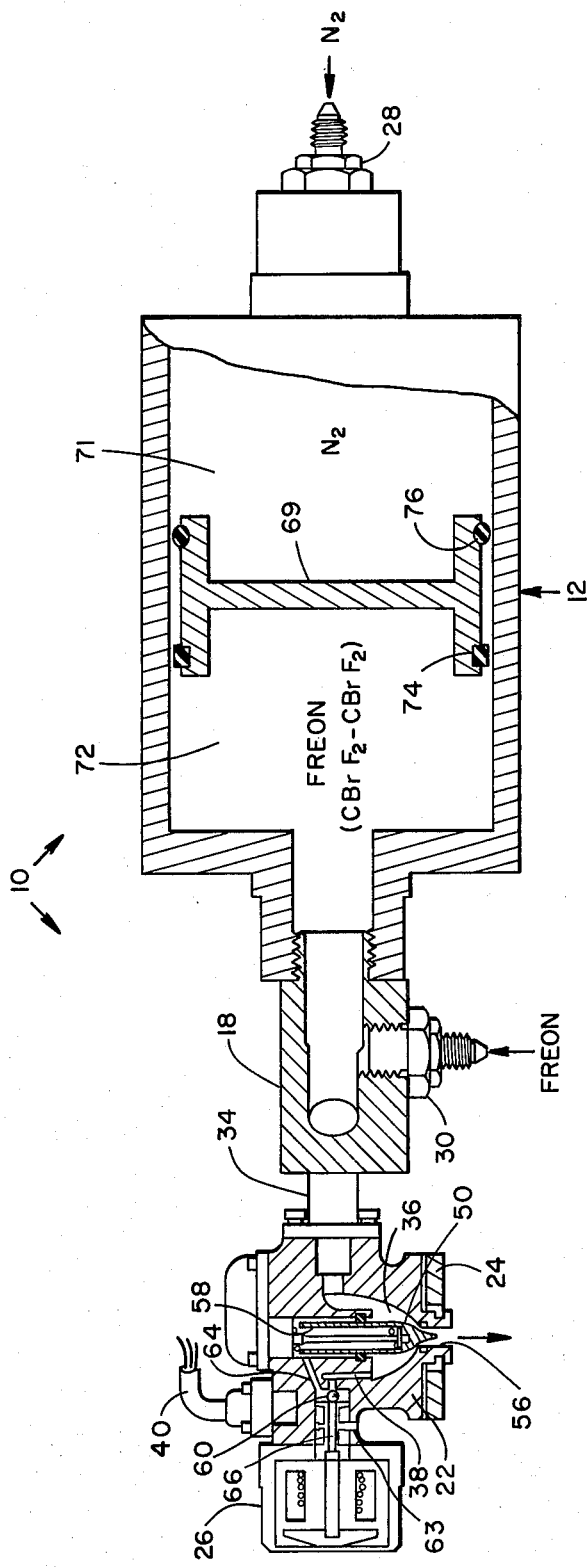
FIG. 3 is a simplified schematic cross sectional view showing the operation of a wing thruster system according to the invention.

As shown in FIG. 3, the accumulator 12 contains a piston 69 slidably mounted therein dividing the accumulator volume into two chambers 71, 72. Piston 69 is shown fitted with two sealing rings 74, 76.

Before a test run using the wing thruster unit, the chamber 92 is filled with a predetermined amount of a high density Freon[1] depending upon the tests to be run. The liquid used in the testing of the disclosed unit was a high density Freon, 114 B2. This Freon ($CBrF_2$ - $CBrF_2$) is a liquid at ambient conditions, boils at 117°F, and freezes at −167°F. Freon is admitted under pressure through fill and vent valve 30. When the desired amount of Freon has been admitted to chamber 71 the valve 30 is closed and the fill tank is disconnected.

[1]Freon is a trademark of E. I. du Pont de Nemours and Company, Wilmington, Del. 19898.

Chamber 72 is then connected to a pressure tank of nitrogen gas and pressurized to the desired pressure. The nitrogen fill and vent valve is then closed and the nitrogen line removed.

If desired the valve 28 may be connected to an aircraft pressure supply source so that (1) the pressure in chamber 72 may be recorded before and after each thrust pulse, thus permitting accurate determination of the thrust level produced and (2) to permit readjustment of the pressure in chamber 72 before the next thrust pulse.

For firing, current is applied to each solenoid coil simultaneously, or individually to produce a desired thrust level.

A series of tests were performed on a system according to the invention to determine system characteristics and a portion of the test results is given in the following table.

| TEST NUMBER | FREON LOADED (milliliters) | PULSE NUMBER | INITIAL PRESSURE (psig) | INITIAL-FINAL THRUST (lb.) |
|---|---|---|---|---|
| | | \<td colspan="3">SYSTEM CHARACTERISTICS - ALL PULSES OF 40 MSEC. DURATION - |
| 5 | 450 | 1 | 1600 | 74.0–71.0 |
| | | 2 | 1482 | 69.0–65.0 |
| | | 3 | 1380 | 65.0–61.0 |
| | | 4 | 1300 | 61.0–57.5 |
| | | 5 | 1230 | 57.5–55.0 |
| | | 6 | 1180 | 55.0–52.0 |
| 6 | 350 | 1 | 1620 | 75.0–71.0 |
| | | 2 | 1505 | 71.0–67.0 |
| | | 3 | 1412 | 66.0–62.5 |
| | | 4 | 1330 | 62.5–58.5 |
| 7 | 230 | 1 | 1600 | 74.0–70.0 |
| | | 2 | 1512 | 71.0–66.0 |

On the basis of experience gained during the tests, it is recommended that the procedures given below be closely followed.

Filling

1. Close $N_2$ port. Apply small current to each valve coil. Connect aspirator to Freon port and evacuate.
2. Close Freon port and attach siphon hose using a suitable clamp. Connect aspirator to $N_2$ port and open.
3. Open Freon port and draw in required quantity of Freon. Allow 70 ml for ullage.
4. Close port, remove hose, and torque fill valve to seal.
5. Remove aspirator line from $N_2$ port, attach pressure line and start accumulator pressurization. When pressure reaches 140 psig, de-activate current to valve coils.
6. Continue accumulator pressurization to desired pressure. Close and torque seal port and remove pressure line.

Firing

Apply full current to each valve coil.

Draining

1. Open $N_2$ port until pressure drops to approximately 50 psig. Close $N_2$ port.
2. Open Freon port to expel as much fluid as possible.
3. Open $N_2$ port to completely depressurize system. Finally close $N_2$ and Freon ports.

What is claimed is:

1. In a thrust producing device for investigating wing flutter in aircraft, the improvement comprising:
   a pressure accumulator;
   means for pressurizing said accumulator;
   valve means connected to said accumulator such that opening of said valve means releases fluid under pressure from said accumulator;
   means mounting said valve means and said accumulator in position on a wing surface near the outboard end thereof; and
   means connected to said valve means for remotely controlling the opening and closing of said valve means to cause reaction forces to act on said surface;
   said valve means comprising at least one electrohydraulically operated thrust valve said thrust valve including first and second chambers communicating with said accumulator so that equal fluid pressure is maintained on both sides of a closure member; means for isolating said chambers from one another and venting one chamber to atmosphere in order to activate said thrust valve.

2. A method of producing periodic vibrations in the wing structure of an aircraft or the like including:
   attaching a fluid jet producing device to said structure near the outboard end thereof;
   said device including an accumulator and remotely operable valve means;
   said valve means being connected to said accumulator and including first and second chambers, one on each side of a closure member and in fluid communication with said accumulator; maintaining equal fluid pressure in both chambers; isolating said chambers from one another and venting one chamber to atmosphere in order to activate said valve; and
   operating said valve means during flight conditions to exert sudden thrust forces on said structure.

3. The method of claim 2 wherein said valve means include a plurality of valves and variation of the level of thrust exerted is accomplished by varying the number of valves operated at one time.

4. The method of claim 3 and said valve means include at least two electrically controllable high pressure thrust valves operable to produce 40 millisecond impulses of approximately 70 pounds force ($1b_f$) when said accumulator is pressurized at about 1500–1600 psig.

5. The method of claim 3 and said accumulator being pressurized to approximately 1500–1600 psig and said valve means being adjusted and controlled to produce a series of 40 millisecond pulses of approximately 70 pounds force (70 $lb_f$).

6. In a method of testing aircraft for critical flutter speed, comprising subjecting a portion of an aircraft while in flight to a momentarily applied vibration producing force in addition to normal forces acting thereon in flight, the improvement comprising:
   attaching a hydraulic accumulator including an effluent conduit near the outboard tip of a protruding aircraft structural member;
   connecting electrically controllable valve means including first and second chambers one on each side of a closure member, in fluid communication with said accumulator; maintaining equal fluid pressure in both chambers; isolating said chambers from one another and venting one chamber to atmosphere in order to activate said valve;
   pressurizing said accumulator with fluid; and
   operating said valve means during flight of said aircraft to exert sudden thrust forces on said member.

7. The method of claim 6 wherein said valve means include a plurality of valves and variation of the level of thrust exerted is accomplished by varying the number of valves operated at one time.

8. The method of claim 7 and said valve means include at least two electrically controllable high pressure thrust valves operable to produce 40 millisecond impulses of approximately 70 pounds force ($1b_f$) when said accumulator is pressurized at about 1500–1600 psig.

9. The method of claim 6 and said accumulator being pressurized to approximately 1500–1600 psig and said valve means being adjusted and controlled to produce a series of 40 millisecond pulses of approximately 70 pounds force (70 $lb_f$).

* * * * *